United States Patent [19]

Huddle

[11] Patent Number: 5,184,304
[45] Date of Patent: Feb. 2, 1993

[54] FAULT-TOLERANT INERTIAL NAVIGATION SYSTEM

[75] Inventor: James R. Huddle, Chatsworth, Calif.
[73] Assignee: Litton Systems, Inc., Beverly Hills, Calif.
[21] Appl. No.: 692,348
[22] Filed: Apr. 26, 1991
[51] Int. Cl.⁵ .............................................. G06F 15/50
[52] U.S. Cl. ....................................... 364/453; 33/321
[58] Field of Search ............... 364/453, 560, 131, 184; 33/318, 321; 318/564

[56] References Cited

U.S. PATENT DOCUMENTS

| | | | |
|---|---|---|---|
| 3,489,004 | 1/1970 | Barnhill | 73/178 |
| 3,680,355 | 8/1972 | Goldstein | 73/1 E |
| 4,173,784 | 11/1979 | Heath et al. | 364/453 |
| 4,425,040 | 1/1984 | Ljung | 356/350 |
| 4,914,598 | 4/1990 | Krogmann et al. | 364/453 |
| 5,012,424 | 4/1991 | Dodson | 364/453 |
| 5,050,087 | 9/1991 | Walrath et al. | 364/453 |

OTHER PUBLICATIONS

Chapter 11–Application Of Kalman Filtering Theory To Augmented Inertial Navigation Systems; Dr. J. R. Huddle; Article of Litton's Guidance & Control Systems Division (Feb. 1970) pp. 233–268.
A New Mathematical Formulation for Strapdown Inertial Navigation; John E. Bortz; The Analytic Sciences Corporation, Reading, Mass.; Aug. 24, 1970; pp. 61–66.

Primary Examiner—Parshotam S. Lall
Assistant Examiner—Michael Zanelli
Attorney, Agent, or Firm—L. David Rish; M. Michael Carpenter

[57] ABSTRACT

Disclosed herein is a Fault-Tolerant Inertial Navigation System comprising, in a preferred embodiment, a Redundant Set of at least two Inertial Navigation Systems, from which one may identify and isolate at least one instrument within an Inertial Navigation Unit which shows substantial performance degradation. The two inertial navigation units are fully capable of performing navigational functions. Each of these inertial navigation units has a plurality of navigational instruments, including at least three linear sensors (such as accelerometers) and three angular change sensors (such as gyroscopes or ring laser gyroscopes). No two linear sensors nor any two angular change sensors of either unit are aligned colinearly. Each of the inertial navigation units produces a set of independent navigational solutions at each of their respective outputs. The independent navigational solutions of each of the navigation units are compared and any significantly degraded performance of any one linear sensor or any one angular change sensor is detected.

8 Claims, 4 Drawing Sheets

FAULT-TOLERANT INERTIAL NAVIGATION SYSTEM

BACKGROUND OF THE INVENTION

1. Field of the Invention

This invention relates to Inertial Navigation, and in particular to a Fault Tolerant system for Inertial Navigation which identifies and isolates at least one instrument within an Inertial Navigation Unit which shows substantial performance degradation.

2. Description of Related Art

Navigation is the process of spatially directing a vehicle (Land, Sea, or Aircraft) from a first point (or point of origin) to another or second point in space. Navigation is often categorized as either position fixing or dead reckoning. Examples of position fixing include celestial navigation or determining one's position with respect to known objects or landmarks. LORAN and related radar systems, and the newer NAVSTAR GPS (Global Positioning System) are also examples of position fixing Navigation. Generally speaking, dead reckoning is the process of estimating ones position by knowledge of one's previous position, his course, his speed and the elapsed time. This category of dead reckoning includes doppler Radar and Inertial Navigation Systems.

Inertial navigation is yet further unique, in that it is a specialized form of Navigation whereby one is able to travel from point one to point two without the benefit or need of any information external to the vehicle. Inertial Navigation is completely self-contained within the traveling vehicle. Inertial Navigation is independent of its operating environment such as wind, visibility, or aircraft attitude. Because such form of Navigation does not radiate RF energy, it is immune to countermeasures. Inertial Navigation makes use of the basic laws of physical motion first described by Sir Isaac Newton over three centuries ago.

A standard Inertial Navigation System (INS), in actual use, such as aboard commercial or military aircraft, is often comprised of three or more independent inertial navigation units, where each unit is composed of 3 accelerometers and 3 gyroscopes so that each unit alone is fully capable of performing the navigation function. Three INU's (Inertial Navigation Units) or more represents a costly method to assure redundancy and accuracy of navigation. An early attempt to provide redundancy in less than three INU's is U.S. Pat. No. 3,489,004, issued Jan. 13, 1970 to D. H. Barnhill et. al. for a NAVIGATIONAL REFERENCE DEVICE (Honeywell, Inc. Assignee). This patent teaches the use of at least four sensor mechanical gyroscopes in each INU mounted to an attitude reference device base unit. When one of the gyroscopes of the INU is faulty, the remaining gyroscopes may be used to function as an INU. Thus, in this reference '004 patent, redundancy is provided within each INU and independent of other INU systems. Such a scheme might be applied to a Ring Laser Gyroscope instrument package, but ring laser gyroscopes are typically one-degree of freedom devices and these ring laser INU's generally are packaged with only sets of three instruments, three gyroscopes and three accelerometers.

Another redundancy scheme demonstrated heretofore can be found in U.S. Pat. No. 3,680,355 issued Aug. 1, 1972 to Goldstein et. al. for METHOD AND APPARATUS FOR PERFORMANCE MONITORING OF DUAL PLATFORM INERTIAL NAVIGATION SYSTEMS (The Singer Company, assignee). In this '355 patent, two platforms are used to provide the required redundancy; however, each platform uses two, two-degree of freedom mechanical gyroscopes to provide adequate redundancy. This is the equivalent of using at least four ring laser gyroscopes and again would be costly.

What is needed is a fault-tolerant navigation scheme which conforms to modern Inertial Navigation Unit packages, comprising three gyroscopes and/or three accelerometers, and uses less than three of such Inertial Navigation systems.

SUMMARY OF THE INVENTION

The invention is a fault-tolerant inertial navigation system comprised of 2 independent inertial navigation units each composed of 3 accelerometers and 3 gyroscopes so that each is fully capable of performing the navigation function.

The fault-tolerant inertial navigation system generally comprises two independent inertial navigation units. These inertial navigation units are fully capable of performing navigational functions. Each of these inertial navigation units has a plurality of navigational instruments, including at least three linear sensors (such as accelerometers) and three angular change or orientation sensors (such as gyroscopes or ring laser gyroscopes).

No two linear sensors nor any two angular change sensors of either unit are co-linear, nor are three co-planar. Each of the inertial navigation units produces a set of independent navigational solutions at each of their respective outputs. The independent navigational solutions of each of the navigation units are compared and any significantly degraded performance of any one linear sensor or any one angular change sensor is detected. In this manner, one of such sensors indicating such degraded performance is isolated and identified as to being faulty.

DETAILED DESCRIPTION OF THE PREFERRED EMBODIMENT

Figure 3:
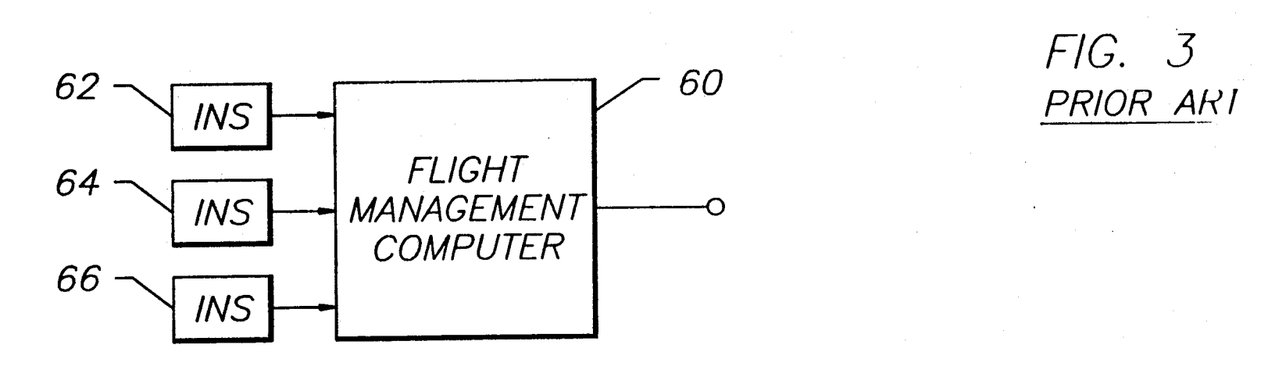
FIG. 3 is a schematic drawing of the PRIOR ART configuration of a navigation redundancy system.

The invention employs a method of comparison of the navigation solutions between the 2 independent navigation units such that in the event that the performance of one gyroscope and/or one accelerometer degrades significantly ("soft" failure) or fails in one unit, this instrument is identified (isolated) as to being faulty. In the prior Art configuration, as schematically shown in FIG. 3, at least three (3) separate and redundant Inertial Navigation Systems (INS) 62, 64, and 66 are needed to provide information to a pilot (through the Flight Management Computer 60) as to the identification of a substantially degraded Navigational Instrument. When such a degraded Navigational Instrument is identified, through use of the triple redundancy and voting, the entire INS is discounted.

Figure 1:
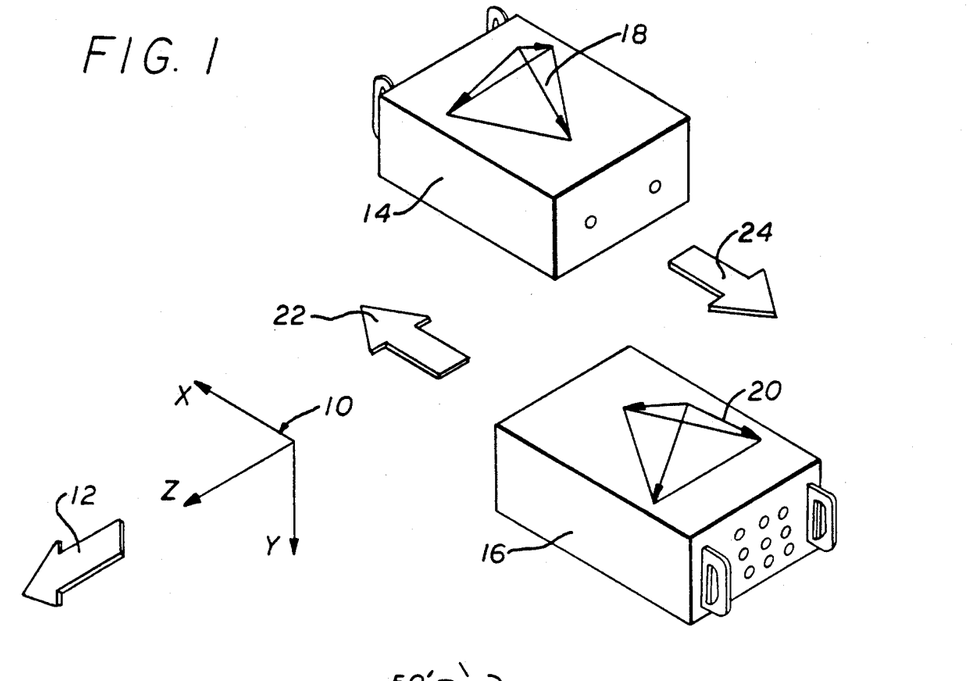
FIG. 1 is a perspective schematic view of the Aircraft Installation Configuration of the Two Inertial Navigation Instrument Assemblies (INA) of this Invention.
Figure 4:
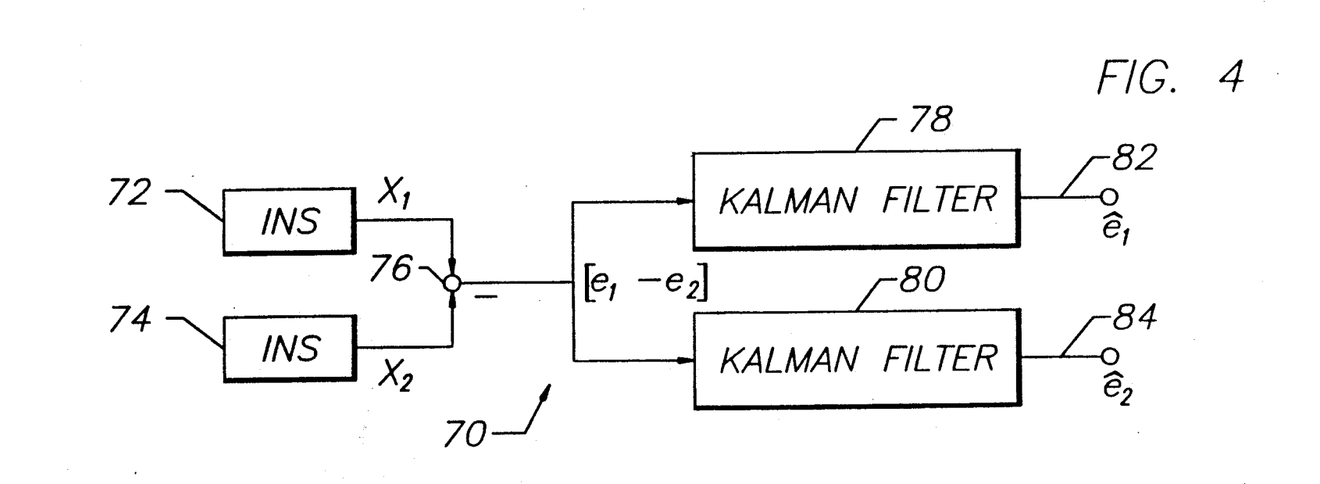
FIG. 4 is a schematic drawing of the Fault Tolerant Inertial Navigation system of this invention.

In contrast to the prior Art embodied in FIG. 3, the present invention has the ability to identify and isolate a degraded Instrument using only two Inertial Navigation Systems 72 and 74 (See, FIG. 4). In order for the Fault Tolerant Inertial Navigation system 70 disclosed in FIG. 4 to properly function, it is useful to examine FIG. 1, 2A, and 2B to see how each Inertial Navigation System's instrument packages 30 and 44, respectively, are configured.

Figures 2A, 2B:
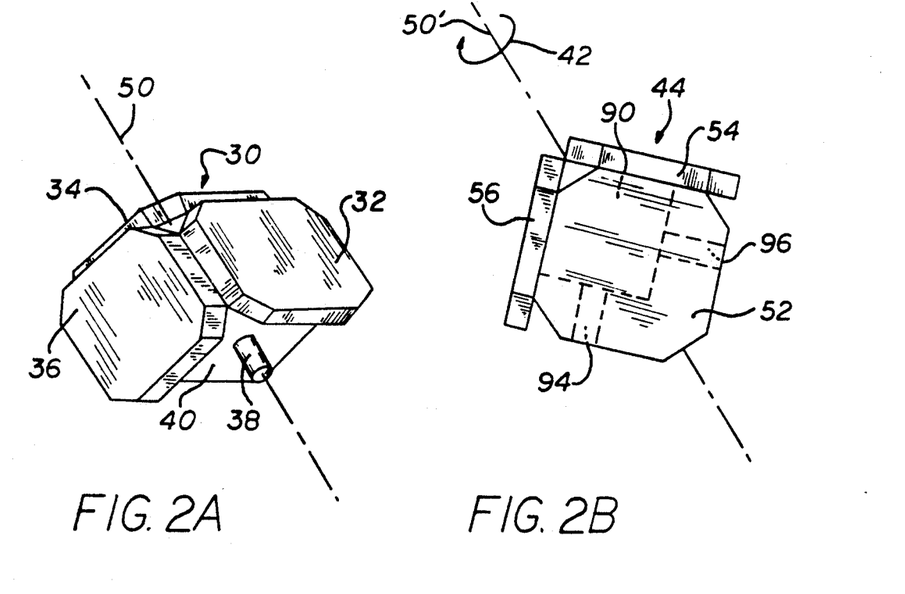
FIGS. 2A and 2B are perspective views of the configuration of the two Inertial Navigation Instrument Assemblies of this Invention as these assemblies are configured during flight within their respective system boxes.

With reference to FIG. 2A, one will note that upon the instrument block 40 is mounted at least three single degree of freedom angular rate sensors, preferably ring laser gyroscopes 32, 34, 36. Each gyroscope 32, 34, and 36 is oriented along a single direction and are orthogonal to one another. Also, mounted on the instrument block 40 are at least three accelerometers (accelerometer 38 being visible schematically in FIG. 2A). Like the angular rate sensors 32, 34, and 36, the linear sensors, such as accelerometer 38, are each oriented along a single direction, normally corresponding to the same axis about which one of the gyroscopes 32, 34, or 36 is mounted. For example, the accelerometer 38 is oriented along the same direction or axis as gyroscope 34. Likewise, accelerometers 94 and 96 are each respectively mounted on instrument block 90 and oriented along the same axis as gyroscopes 54 and 56.

In order to allow the Fault Tolerant Inertial Navigation system 70 to operate, it is important that the axes 18 and 20 (FIG. 1) of the Inertial Navigation systems 14 and 16 are oriented such that none of the three directions in each system are collinear. In order to achieve this requirement, one may orient each instrument package differently such as the manner in which axes 18 and 20 are oriented. All the axes of the two systems are 60° apart from one another (about the Y-axis). This is illustrated in FIGS. 2A and 2B where when one lines up the two instrument blocks 40 and 90 along parallel axes 50 and 50', it will be noted that the instruments affixed to the block 90 are rotated 60° with respect to one another (rotation 42 about axis 50'). None of the sensing axes of measurement of any of the gyroscopes 32, 34, or 36 (FIG. 2A) align with any of the gyroscopes 52, 54, or 56 (FIG. 2B). By mounting the systems 14 and 16 backward with respect to one another (FIG. 1) (along mounting directions 22 and 24), the 60° rotation of orientation is automatically achieved and measuring axes are in alignment. To obtain this capability no individual accelerometer of one navigation unit should be approximately collinear with an individual accelerometer sensing axis of the other navigation unit and no individual gyroscope sensing axis of one navigation unit should be approximately collinear with an individual gyroscope sensing axis of the other navigation unit.

Comparison of the navigation solutions obtained by the 2 navigation units can be done at either the computed vehicle position, computed vehicle velocity or computed vehicle orientation level or any combinations of these levels. With reference to FIG. 4, assuming that none of the measuring axes of the instruments are aligned, output variables of $X_1$ and $X_2$ are provided by each INS 72 and 74 for the same measured parameter (such as orientation, velocity, and/or position). The system 70 then combines these variables $X_1$ and $X_2$ at the difference node 76, and the difference is then processed by Kalman Filters 78 and 80 in real time according to algorithms known in the art to provide an estimate of the accuracy of each output signal and other modeled error parameters. At the outputs 82 and 84 of each filter are presented estimate vector quantities $\delta\hat{e}_1$ and $\delta\hat{e}_2$, from which a determination can be made whether the instruments in each system 72 and 74 are working properly, and if not, an identification of the location of the defective instrument, in either system 72 and 74, can be determined. In this manner, a fault tolerant inertial navigation system is derived. The differences in the compared computed quantities (position, velocity, and/or orientation) are processed by an optimal estimation (Kalman filter) algorithm which includes as its error states the errors in the computed navigation variables (position, velocity, orientation) and appropriate error states for the inertial instruments, including for example individual gyroscope and accelerometer biases, scale factor errors, mounting misalignments of the accelerometers and gyroscopes within each navigation unit with respect to each other and mechanical misalignments between the two navigation units. The basic idea of the invention is that the pattern of differences between the navigation solutions of the two navigation units will in the event of degraded performance or failure of one accelerometer and/or gyroscope in either navigation unit result in a large (relative to nominal expectations) estimate of the error parameters of that instrument (for example a gyroscope) in the degraded navigation unit via the Kalman filter processing. On the other hand, the estimates of the instrument error parameters for the like instruments (i.e. the gyroscopes) for the non-degraded navigation unit will also be significantly large (relative to nominal expectations). This occurs as the sensing axis directions for the gyroscopes (accelerometers) of the non-degraded navigation unit are significantly different in orientation than the gyroscopes (accelerometers) of the degraded navigation unit resulting in an assignment (estimate) of the degraded performance behavior to more than one instrument in the non-degraded navigation unit. Hence under the assumption that only a single gyroscope and/or accelerometer degradation will occur in one navigation unit at any one time, it is seen how the degrading instrument is identified.

With reference to FIG. 4, Output vectors, $X_1$, $X_2$ which include output signals from the inertial navigation systems (INS's) 72 and 74, are state vectors which may be expressed as follows:

$$\begin{bmatrix} x_{11} \\ \cdot \\ \cdot \\ x_{N1} \end{bmatrix} = X_1 = X_T + e_l, \text{ and, } \begin{bmatrix} x_{12} \\ \cdot \\ \cdot \\ x_{N2} \end{bmatrix} = X_2 = X_T + e_2.$$

Where, $X_1$ is a set of states associated with INS 72 and $X_2$ is a set of states associated with INS 74; $X_T$ is the true or ideal state vector and $e_1$ and $e_2$ are the error in the actual state vectors of INS 72 and 74. When output vectors, $X_1$, $X_2$, are joined at difference node 76, the true state vector, $X_T$, drops out, so that the net output from node 76 is $[e_1-e_2]$. This difference quantity, $[e_1-e_2]$, is then separately processed by two separate Kalman Filters 78 and 80, such that an output error estimate vector, either $\hat{e}_1$ or $\hat{e}_2$, [82, 84] is associated with each Filter and each corresponding INS.

The invention obtains a significant extension of the state-of-the art for a redundant navigation system using 2 independent navigation units each comprised of 3 accelerometers and 3 gyroscopes. Customarily such a system is termed "Fail-Safe" as when the navigation solutions are compared as above, if they remain within a prescribed tolerance of each other, it is concluded that both navigation units are properly operating and the navigation solutions are deemed reliable or "safe". On the other hand, if the comparison of the navigation solutions exceeds a prescribed tolerance, a fault or degradation is declared and neither navigation solution is assumed reliable as one cannot determine which is obtained from the degraded navigation unit. Consequently an "Unsafe" situation now exists without the use of some other independent navigation system.

Note in the invention, since the degraded or failed accelerometer and/or gyroscope in one navigation unit is identified, the non-degraded navigation unit with its reliable navigation solution is identified. Consequently an improved situation to that described in the above paragraph has been realized without the use of some other independent navigation sensor.

The invention includes the following extension such that the property termed "Fail-Operate", "Fail-Safe" is realized. To obtain the latter stage of "Fail-Safe" with the situation of a degraded or failed gyroscope and/or accelerometer in one unit, additional navigation solutions must be obtained from the remaining non-degraded instruments such that a further failure or degradation of an accelerometer and/or gyroscope will be detected (isolation is not required) by comparison of these navigation solutions. This capability is obtained by combining the remaining non-degraded instruments in the degraded navigation unit with the individual gyroscopes and accelerometers of the non-degraded navigation unit, one at a time, so as to generate a set of 3 navigation solutions.

For example if a degraded or failed gyroscope has been identified in one unit, the triad of accelerometers and 2 non-degraded gyroscopes in this unit can be employed with the 3 gyroscopes in the non-degraded unit one at a time to generate 3 distinct navigation solutions (note that ten distinct navigation solutions exist). Comparison of these solutions between themselves and with the navigation solution from the non-degraded unit provides the basis for detection of an additional instrument failure or degradation in either navigation units.

The practical difficulty with the above approach in obtaining accurate navigation solutions using instruments in different navigation units, arises due to the existence of unknown static and dynamic misalignments between the two instrument assemblies (or blocks) of the 2 navigation units.

The static and/or slowly-changing misalignments between the instrument blocks can be measured with high accuracy on a continual basis by comparison of the computed vehicle or body orientation as obtained from each of the navigation units, further enhanced via the processing of a Kalman estimator incorporating these misalignments as error states. Note further that the mounting misalignments of the gyroscopes and accelerometers relative to each other within each navigation unit, although a much less serious source of navigation error, are also continuously calibrated.

The dynamic misalignments between the instrument blocks of the 2 navigation units is highly-dependent on the interconnecting mechanical structure and the forces imposed upon it due to vehicle dynamics. When all the inertial instruments are operating properly, processed differential measurements (e.g. measured angular change and force differences and computed orientation differences) between the inertial instruments of the 2 navigation units yield precise indications of these dynamic misalignments (flexure) including amplitude, frequency, the relative phase and the extent of coherence of the motion about any 3 orthogonal axes. This information can be employed to construct predictive dynamic models of the differential dynamic flexure between the instrument blocks of the 2 navigation units. Hence for a reasonably well-behaved mechanical structure (i.e. a structure exhibiting some coherence between the differential angular motion about 3 orthogonal axes), such a predictive model can estimate the dynamic flexure motion in the absence of a full set of processed differential instrument measurements between the 2 navigation units. Consequently when a gyroscope and/or accelerometer in one navigation unit is identified as having faulty operation, then the predictive model of dynamic differential motion of the instrument blocks of the 2 navigation units can be employed to enable an improved utilization of instrument measurements obtained from one navigation unit with those from the other navigation unit to obtain an improved navigation solution.

Clearly in the event of that a faulty accelerometer is identified, full knowledge of the dynamic differential angular motion between the 2 instrument blocks is available from the properly operating gyroscope triads of each navigation unit. This permits utilization of accelerometer measurements from the non-degraded navigation unit with the 2 accelerometer measurements of the degraded navigation unit to obtain rather high-quality navigation solutions. Note further that the navigation solutions obtained by using the instruments from one inertial unit with those of the other navigation unit, enhanced by employing static and dynamic estimates of misalignments between the instrument blocks of the 2 inertial units, can be continuously computed and compared with the (most accurate) navigation solutions of each navigation unit. This comparison provides not only an indication of the quality of such a navigation solution but also serves as a basis for improving the estimates of the static misalignments and the predictive models for the dynamic misalignment.

Figure 5A:
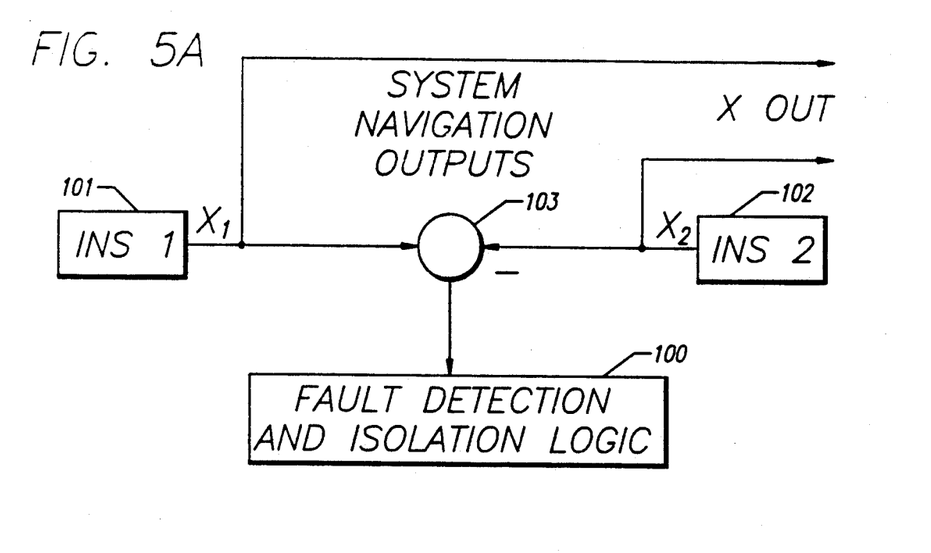
FIG. 5A is a schematic drawing showing how the Fault Detection and Isolation Logic system interact with the Inertial Navigation Systems of this invention.
Figure 5B:
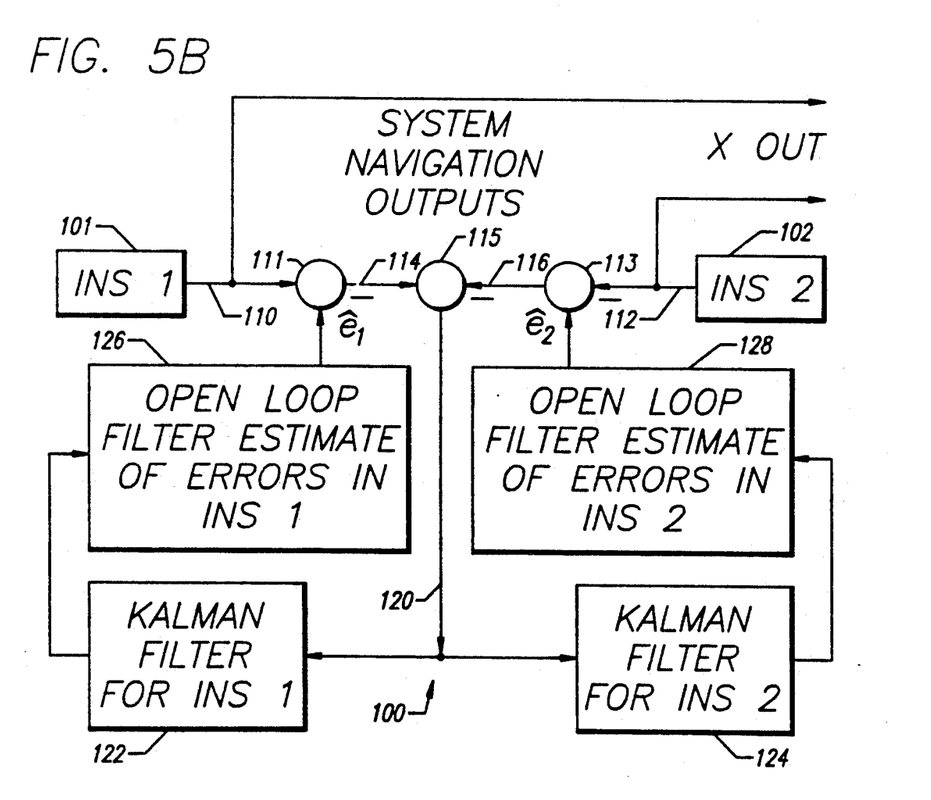
FIG. 5B is a detailed schematic drawing showing how the Fault Detection and Isolation Logic system estimates error with respect to the Inertial Navigation Systems parameters.
Figure 5C:
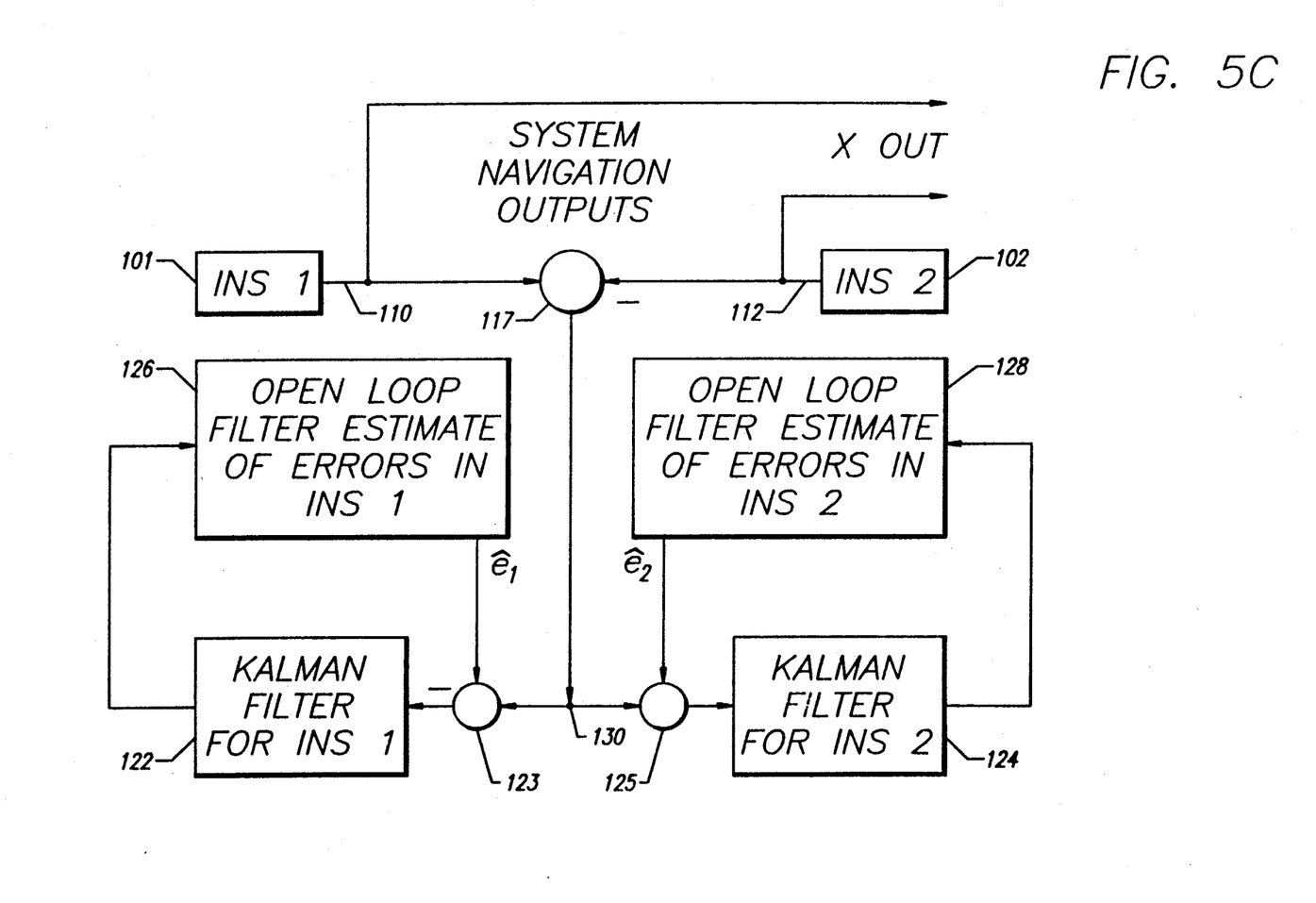
FIG. 5C is an alternate embodiment to the system shown in FIG. 5B, and details a schematic drawing showing how the Fault Detection and Isolation Logic system estimates error with respect to the Inertial Navigation Systems (INS) parameters, where the error estimates associated with one of the Inertial Navigation Systems are isolated from the error estimates associated with the other system.

FIGS. 5A, 5B, and 5C show a more detailed operation of the fault detection system of this invention. With reference to FIG. 5A, it can be seen that generally the Inertial Navigation Systems, INS 1 (101) and INS 2 (102) provide System Navigation outputs $X_{out}$, to the Aircraft or vehicle computer, which outputs may then be used for navigation. Additionally, the respective output state Vectors $X_1$ and $X_2$ may be combined at the Summer 103, to provide error signals which allow determination of which instruments of the dual INS installation are exhibiting degraded performance. The objective of the fault detection and isolation logic 100 of FIG. 5A is to employ large differences of commensurate navigation outputs as computed parameters, such as position, velocity, and vehicle (or instrument frame) orientation between the two INS systems 101 and 102, for the purposes of: (1) detecting that a fault or faulty instrument exists; and, (2) attributing this fault to the individual inertial instrument indicating the faulty operation so that this instrument may be isolated. Where fault isolation can be achieved and the fault is in only one of the navigation systems 101 or 102, then system fault tolerance is enhanced as the properly operating system is identified.

An architecture for implementing a preferred embodiment of the fault tolerance system shown generally in FIG. 5A is shown in FIG. 5B. The Inertial Navigation Systems, INS 1 (101) and INS 2 (102) provide System Navigation outputs $X_{out}$, to the Aircraft or vehicle computer, which outputs may then be used for navigation (as in FIG. 5A). Additionally, the respective output Vectors 110 ($X_T + e_1$) and 112 ($X_T + e_2$) may be combined as follows (at nodes 111 and 113, respectively): Vector 110 with $\hat{e}_1$, and Vector 112 with $\hat{e}_2$. The resulting difference from such a combination provides an output of $X_T + \bar{e}_1$ along flow path 114 and an output of $X_T + \bar{e}_2$ along flow path 116 (where $\bar{e}_1$ and $\bar{e}_2$ are error in the estimates $\hat{e}_1, \hat{e}_2$ of the errors $e_1$, $e_2$ in individual INS's respectively). The resulting differences 114 and 116 are then combined (at the summer node 115) to produce the result shown at flow path 120, namely $\theta = \hat{e}_1 - \hat{e}_2$, where $\bar{e}_1 = [e_1 - \hat{e}_1]$; $\bar{e}_2 = [e_2 - \hat{e}_2]$; and, $\theta =$ Observation. The vector, $\hat{e}_1$, is known as the estimate of the error vector $e_1$ for INS 1 (101); and the vector $\hat{e}_2$ is known as the estimate of the error vector $e_2$ for INS 2 (102). The estimates, $\hat{e}_1$ and $\hat{e}_2$, are provided which allow determination of which instruments of the dual INS installation are exhibiting degraded performance. Here, certain error state variables (for position (P), velocity (V), and orientation (0)), set forth in the Navigational Co-ordinates, N (North), E (East), and V (Vertical), form the sub-vectors $e_{s1}$ and $e_{s2}$:

$$\begin{bmatrix} P_{N1} \\ P_{E1} \\ P_{V1} \\ V_{N1} \\ V_{E1} \\ \cdot \\ \cdot \\ O_{V1} \end{bmatrix} = e_{s1} ; \text{ and } e_{s2} = \begin{bmatrix} P_{N2} \\ P_{E2} \\ P_{V2} \\ V_{N2} \\ V_{E2} \\ \cdot \\ \cdot \\ O_{V2} \end{bmatrix}$$

Only the sub-vectors, $e_{s1}$ and $e_{s2}$, of the raw Observation, $\theta = \bar{e}_1 = \bar{e}_2$, are processed through Kalman Filters 122 and 124 (gain elements) for deriving an input signal to the Open Loop Filter Estimate Propagators 126 and 128, which is used to estimate new values of $\hat{e}_1$ and $\hat{e}_2$. Other error state variables, such as gyro drift, which are included in the vectors $e_1$ and $e_2$, are not part of the sub-vectors, $e_{s1}$ and $e_{s2}$, and are not processed by the Kalman Filters 122 and 124, nor are these values processed by the Propagators 126 and 128. Propagators 126 and 128 are optimal estimate propagators which act here, in an open loop fashion, to produce the optimum error estimate signals, $\hat{e}_1$ and $\hat{e}_2$. A detailed explanation of the operation of open loop optimal estimate propagators, such as propagators 126 and 128 (as well as gain elements 122 and 124), is disclosed in an article by J. R. Huddle (the applicant herein), entitled "Chapter 11—APPLICATION OF KALMAN FILTERING THEORY TO AUGMENTED INERTIAL NAVIGATION SYSTEMS", at pages 231–268, and found in publication 139 of the Guidance and Control Panel of AGARD-NATO (North Atlantic Treaty Organization [NATO], Advisory Group for Aerospace Research and Development [AGARD]), entitled THEORY AND APPLICATION OF KALMAN FILTERING (1970). In particular, FIG. 10 (page 262) of the article and its accompanying description (at pages 247–251 of the article) explain the operation of propagators like those at 126 and 128 of FIGS. 5B and 5C, acting in concert with gain elements 122 and 124, to provide an open loop Kalman Filter estimate. The output of propagators 126 and 128 are re-computed values of the error estimate vectors, $\hat{e}_1$ and $\hat{e}_2$, which values are used to correct the error vector for each Navigational System.

With reference to FIG. 5C, as with the system of FIG. 5B, the Inertial Navigation Systems, INS 1 (101) and INS 2 (102) provide System Navigation outputs $X_{out}$, to the Aircraft or vehicle computer, which outputs may then be used for navigation (as in FIG. 5A). Additionally, the respective output Vectors 110 ($X + e_1$ and 112 ($X + e_2$ may be combined at node 117, resulting in an output along flow path 130, such that the signal along 130 (known as a raw observation, $\theta$), may be computed according to the equation, $\theta = e_1 = e_2$. This observation is then corrected by the relevant error estimate state variables (of position, velocity, and orientation) found in the sub-vectors, $e_{s1}$ and $e_{s2}$, and only these sub-vectors are processed in the Kalman filters 122 and 124. The output of the Kalman filters 122 and 124 is then processed by Propagators 126 and 128. The error signals, $\bar{e}_1$ and $-\bar{e}_2$, are then processed through Kalman Filters 122 and 124 (which compute gain elements) for deriving an input signal to the Open Loop Error Filter Estimate Propagators 126 and 128. As in FIG. 5B, the Propagators 126 and 128 are optimal estimate propagators which act, in an open loop fashion, to provide optimum error estimates, $\hat{e}_1$ and $\hat{e}_2$, of the error vectors $e_1$ and $e_2$, respectively, in the system. It can be seen that in this embodiment the resulting error vectors, $\hat{e}_1$ and $\hat{e}_2$, are computed without being affected by the computation of each other. This is in contra-distinction to the embodiment in FIG. 5B wherein such an effect of $\hat{e}_1$ on $\hat{e}_2$ and $\hat{e}_2$ on $\hat{e}_1$ is present.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, although the invention is primarily directed at fault tolerant Navigation systems, the principles which govern such Systems also may be applied to Flight Control Systems to detect Fail-Operate, Fail-Safe conditions. Thus, alternate embodiments with substantially equivalent functions or structures are intended to be comprehended within the scope of the appended claims.

What is claimed is:

1. A fault-tolerant inertial navigation system, comprising:

only two independent inertial navigation units, each of said inertial navigation units performing navigational functions, and each of said inertial navigation units comprising a plurality of single degree of freedom navigational instruments, none of which produce redundant measurements, including at least three linear force sensors and three angular change sensors, any two of said linear sensors and any two of said angular change sensors of either unit aligned other than co-linear; and, all three of said linear sensors, and all three of said angular change sensors positioned in different planes;

each of said inertial navigation units producing a set of independently derived navigational solutions at each of their respective outputs, said independently derived navigational solutions providing estimates of error parameters indicative of the performance of each sensor in each of said navigation units;

means for comparing said independent navigational solutions of each of said navigation units and detecting any significantly degraded performance of either of said navigation units, by contrasting said estimates of error parameters of each instrument in one navigation unit with the estimates of error parameters in the other navigation unit:

whereby, one of said navigation units indicating such degraded performance, is isolated and identified as to being faulty.

2. The fault-tolerant inertial navigation system of claim 1, wherein:

said means for comparing said independent navigational solutions includes an optimal estimation Kalman filter, operating according to a Kalman algorithm which processes differences in the compared navigational solutions, and said algorithm includes in its error state vector the errors in navigation variables, such as position, velocity, and orientation; and said Kalman algorithm further includes error states for the inertial instrument errors.

3. The fault-tolerant inertial navigation system of claim 2, wherein:

said Kalman filter algorithm of said comparing means includes performance factors such as individual angular change sensors and linear force sensor biases, scale factor errors, mounting misalignments of said angular change and linear force sensors within each of said navigation units, with respect to one other, and mechanical misalignments between the two navigation units.

4. The fault-tolerant inertial navigation system of claim 2, wherein:

said means for comparing said independent navigational solutions further includes:

means for computing a set of error state estimate values, said error state estimate values being computed navigation variables, such as position, velocity, and orientation, said error state estimate values forming sub-vectors, $\hat{e}_{s1}$ and $\hat{e}_{s2}$ of the error estimate vectors $\hat{e}_1$ and $\hat{e}_2$;

means for combining said set of said independent navigational solutions, which solutions are provided at each of the respective outputs of said inertial navigation units, with said computed error state estimate values;

means for determining changes in said error estimate state values as a function of the error in the estimated values of the independent navigational solutions from both of said inertial navigation units;

means for updating said error estimate state values with said changes in said error state estimate values;

whereby, estimated navigational solutions approach the true navigational solutions for each navigational unit so that fault detection of navigational instruments is achieved.

5. The fault-tolerant inertial navigation system of claim 2, wherein:

said means for comparing said independent navigational solutions further includes:

means for computing a plurality of sets of error state estimates, each set comprising estimates associated with error state variables such as errors in position, velocity, and orientation, for each of said navigational units;

means for determining changes in said error state estimate values, wherein a function of the error state vector estimates for each of said inertial navigation units is obtained independent of any effect of one of said navigation units on the other;

means for updating said error state estimate values with said changes in said error state estimate values;

whereby, estimated navigational solutions approach the true navigational solutions for each navigational unit so that fault detection of navigational instruments may be achieved.

6. The fault-tolerant inertial navigation system of claim 1, wherein:

said means for comparing said independent navigational solutions includes a least square estimation algorithm which processes differences in said compared navigational solutions, and said algorithm includes in its error states the errors in navigation variables, such as position, velocity, and orientation; and said algorithm further includes error states for the inertial instrument errors.

7. The fault-tolerant inertial navigation system of claim 1, wherein:

said means for comparing said independent navigational solutions of each of said navigation units and detecting any significant degraded performance detects significantly degraded performance of any one sensor of a first type of instrument and significantly degraded performance of any one sensor of a second type of instrument;

means for identifying the type of a first of such sensors exhibiting such significantly degraded performance and, said identifying means further identifying the type of a second of such sensors exhibiting such significantly degraded performance, provided such second sensor is a different type than said first sensor;

whereby, a first of such sensors indicating such degraded performance is isolated and identified as to being faulty, and a second of such sensors, of a different type than the first of such sensors so identified, is also identified.

8. A fault-tolerant inertial navigation system, comprising:

only two independent inertial navigation units, each of said inertial navigation units measuring at least one of a plurality of navigational variables, such variables including position, velocity, and orientation, and each of said inertial navigation units comprising a plurality of single degree of freedom navigational instruments including at least three linear force sensors and three angular change sensors, any two of said linear sensors and any two of said angular change sensors of either unit aligned other than co-linear; and, all three of said linear sensors, and all three of said angular change sensors positioned in different planes;

each of said inertial navigation units producing a set of independently derived navigational solutions at each of their respective outputs, said independently derived navigational solutions providing estimates of error parameters indicative of the performance of each sensor in each of said navigation units;

means for comparing said independent navigational solutions of each of said navigation units and detecting any significantly degraded performance of either of said navigation units, by contrasting said estimates of error parameters of each instrument in one navigation unit with the estimates of error parameters in the other navigation unit;

whereby, one of said navigation units, indicating such degraded measurement performance, is isolated and identified as to being faulty.

* * * * *